United States Patent

[11] 3,579,280

| [72] | Inventors | Douglas A. Florance<br>Vestal;<br>Lloyd P. Nordholm, Binghamton, N.Y. |
|---|---|---|
| [21] | Appl. No. | 825,911 |
| [22] | Filed | May 19, 1969 |
| [45] | Patented | May 18, 1971 |
| [73] | Assignee | Flo-Root, Inc.<br>Village of Endicott, N.Y. |

[54] ELECTRICAL GROUND FAULT DETECTOR WITH TRANSFORMER COUPLING, A BATTERY SUPPLY SOURCE AND BATTERY CHARGING MEANS
1 Claim, 3 Drawing Figs.

[52] U.S. Cl. .................................................. 324/51, 324/127, 340/253
[51] Int. Cl. ............................................................ G01r 31/02
[50] Field of Search ............................................. 324/51, 127, 133; 320/40, 39; 317/18, 27; 340/253

[56] References Cited
UNITED STATES PATENTS

| 2,724,821 | 11/1955 | Schweitzer | 324/127X |
| 3,187,225 | 6/1965 | Mayer | 317/27X |
| 3,213,321 | 10/1965 | Dalziel | 317/27X |
| 3,252,052 | 5/1966 | Nash | 317/18 |
| 3,253,215 | 5/1966 | Moakler et al. | 324/127X |
| 3,300,650 | 1/1967 | Daien | 317/27X |
| 3,312,889 | 4/1967 | Gold | 320/40X |
| 3,356,939 | 12/1967 | Stevenson | 324/51 |
| 3,402,325 | 9/1968 | Minks | 320/39X |
| 3,426,263 | 2/1969 | Hennigan et al. | 320/40X |

*Primary Examiner* — Gerard R. Strecker
*Attorney* — Frederick E. Bartholy

ABSTRACT: A ground fault detector applied to an electrical supply system is disclosed. It utilizes a ring-type current transformer, a battery power source, and a solid-state control device operable by preselected current imbalance to energize an alarm. In addition, a modification of the apparatus includes a charging circuit inductively coupled to a branch of the monitored electrical supply to maintain the capability of the battery.

Patented May 18, 1971     3,579,280

INVENTORS
DOUGLAS A. FLORANCE
LLOYD D. NORDHOLM

BY

ATTORNEY 3,579,280

ELECTRICAL GROUND FAULT DETECTOR WITH TRANSFORMER COUPLING, A BATTERY SUPPLY SOURCE AND BATTERY CHARGING MEANS

BACKGROUND OF THE INVENTION

Phase conductors in an electrical system have generally not been equipped with ground fault detectors because of the expense involved in obtaining sufficiently sensitive devices. Such conductors are protected most often only against current overload and short circuits and are left unprotected against arcing ground faults. Faults of this type are troublesome because of high impedance and low currents involved, and are dangerous because of the severe shock hazards that can result from the situation.

Ground fault detectors must be sensitive to small currents and also be inexpensive enough to encourage their use. Several detectors are commercially available but one must choose between inexpensive and relatively insensitive devices or those devices that are both expensive and sensitive to leakage currents in the fractional ampere range. A disadvantage of the known fault detectors is their requirement of a significant operating current for the circuit breaker or alarm when a fault is detected. The current source has been that induced in the detector because of the fault or a separate power supply connected to the detector. In the former instance, the sensitivity of the detector is impaired and in the latter, the provision of a separate source is expensive in that it requires maintenance.

Accordingly, a primary object of this invention is to provide an electrical ground fault detector that is reliable, sensitive to low leakage currents, and one which can be readily used at remote locations.

Another object of this invention is to provide a fault detector that is also inexpensive and adaptable to both main supply systems and feeder or subfeeder systems.

A still further object of this invention is to provide an electrical fault detector that includes an independent power supply and means for automatically maintaining such supply at peak value while requiring a minimum of attention.

Briefly stated, the invention in its simplest form comprises a window or ring-type transformer surrounding the conductors of the electrical system, the conductors in effect acting as the primary winding thereof. Attached to a single or secondary winding are the terminals of a voltage-responsive device such as the gate electrode and cathode of a silicon-controlled rectifier. A battery and a load, such as an alarm device, are connected in series between the gate electrode and rectifier anode. An auxiliary circuit provides a continuous or "trickle" charge to the battery, maintaining it at full capacity. The auxiliary charging circuit operates off one of the system phase conductors enabling the fault detector to be placed at a remote location and be kept at full operating efficiency. Reliability has been advanced with the incorporation of a solid-state control element in the detector.

Other objects, features and advantages will be apparent from the following description of the invention, defined in particularity in the appended claims, and taken in connection with the accompanying drawings, in which:

DETAILED DESCRIPTION

Figure 1:
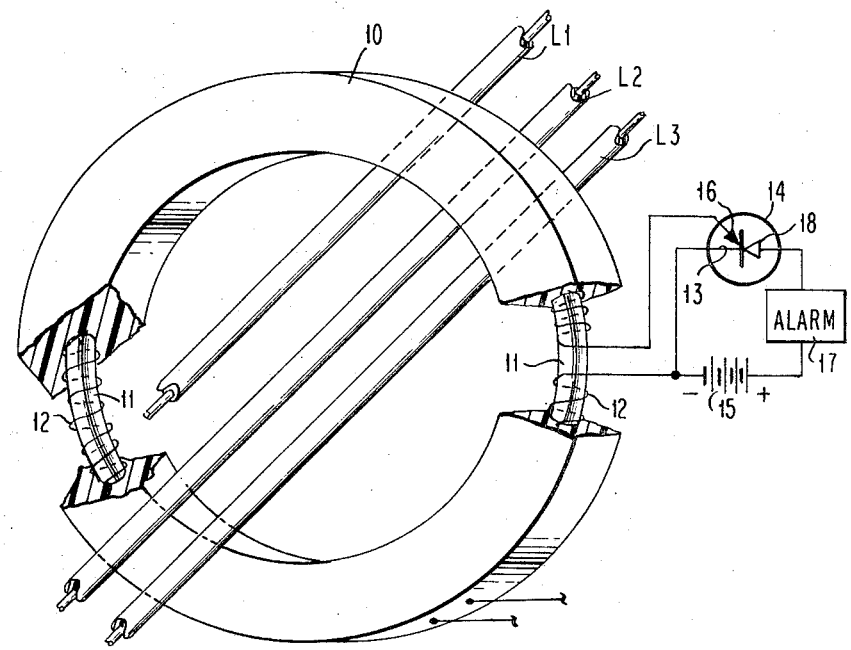
FIG. 1 is a schematic diagram of an electrical fault detector constructed in accordance with this invention.

Referring to FIG. 1, a current transformer 10 is placed so as to encompass all of the electrical supply system conductors L1, L2, and L3, shown here as insulated conductors which may represent, for example, a three-phase system or a single-phase, three-wire alternating current system of which a neutral conductor is generally grounded. Transformer 10 includes a soft iron core 11 having a winding 12 uniformly wound thereon over approximately the entire length of the core. The core and winding are potted in a suitable insulative material. The core is preferably made up of laminated layers of magnetic material in the usual fashion.

One end of winding 12 is connected to the cathode 13 of silicon-controlled rectifier (SCR) indicated generally at 14 and to the negative terminal of the battery 15. The other end of winding 12 is connected to the gate electrode 16 of SCR 14. An alarm or circuit breaker 17 is connected between the anode 18 of the SCR and positive terminal of the battery to complete the fault detector circuit. Although a battery has been shown, any DC power supply of suitable characteristics can be used.

In operation under a condition of no ground fault, the instantaneous sum of the currents flowing in lines L1, L2, and L3 will be zero; hence, the sum of the magnetic flux will also be zero and no current will be induced in winding 12. This is a balanced condition and the detector will not operate.

If a fault in one of the lines L1, L2, or L3 be assumed, i.e., a leakage current to ground, the balanced condition is upset so that the instantaneous sum of the currents is not equal to zero and the resultant magnetic flux will induce a current in winding 12 and thus a potential difference between cathode 13 and gate electrode 16. When this potential difference or voltage reaches a predetermined magnitude across SCR 14, it is triggered into conduction so that current from battery 15 can flow through alarm device 17, SCR 14, and winding 12 back to battery 15. Once so triggered, the SCR 14 continues its conduction regardless of whether the leakage current continues. It will be seen that the sensitivity of the detector can be varied to the degree desired by altering the number of turns on core 11. Thus a wide variation in leakage current is possible for actuation of the detector circuit. Note that no current from the battery will flow when SCR is not triggered because of the reverse-biasing between cathode 13 and gate electrode 16.

Figure 2:
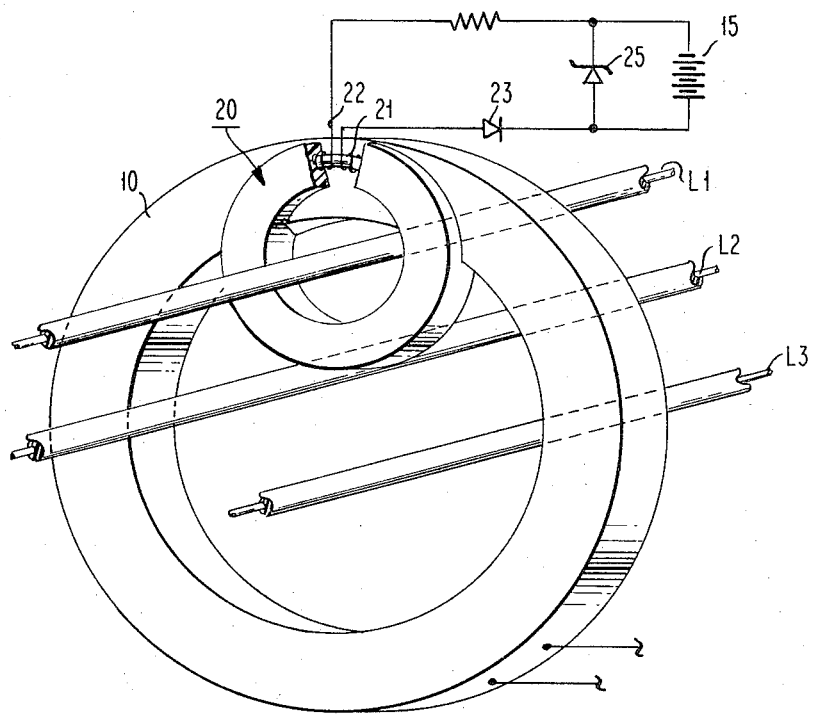
FIG. 2 is a schematic diagram of a modified fault detector which includes an auxiliary current transformer and charging circuit.

The fault detector as shown is also readily adaptable for installation at remote locations and can be reliably left unattended, until a fault occurs, by including a charging circuit for the battery, as shown in FIG. 2. For the sake of clarity of illustration, the fault detection circuit is omitted from this FIG.; however, it is the same as in FIG. 1. Current transformer 10 is arranged to encompass lines L1, L2, and L3 as in FIG. 1. An auxiliary current transformer 20 is added, however, and encompasses only one current-carrying conductor, such as L1. This transformer, like transformer 10, also has a soft iron core 21 and secondary winding 22 thereon. One end of winding 22 is connected to the anode of diode 23 and the other end of the winding is connected to the negative terminal of battery 15 in series with current-limiting resistor 24. A zener diode 25 is connected from the negative battery terminal to the cathode of diode 23. Auxiliary current transformer 20 and main transformer 10 can be formed as a unitary structure, for example, by potting the two simultaneously in a common mold. The winding of transformer 20 is oriented perpendicular to that of transformer 10 to minimize interaction.

The operation of the auxiliary charging circuit is as follows:

Since a single conductor L1, as far as the transformer winding 22 is concerned, is not balanced as to current flow by a second conductor, there is a continuous alternating current flow which induces an alternating current in winding 22. Diode 23 serves as a half-wave rectifier and resistor 24 limits current flow. On alternate half cycles, when the diode is forward-biased, a charging current is impressed across battery 15. Zener diode 25 is selected and poled as a current bypass when the voltage across battery 15 reaches a predetermined value to prevent overcharge. By choosing an appropriate value for resistor 24, the charging rate for battery 15 can be kept small and is an insignificant load on line L1. Battery 15 is preferably of the nickel-cadmium type, assuring long life. With this arrangement, battery 15 is reliably maintained at full charge for operating the alarm circuit so that the entire fault detector can be used safely at remote locations.

Figure 3:
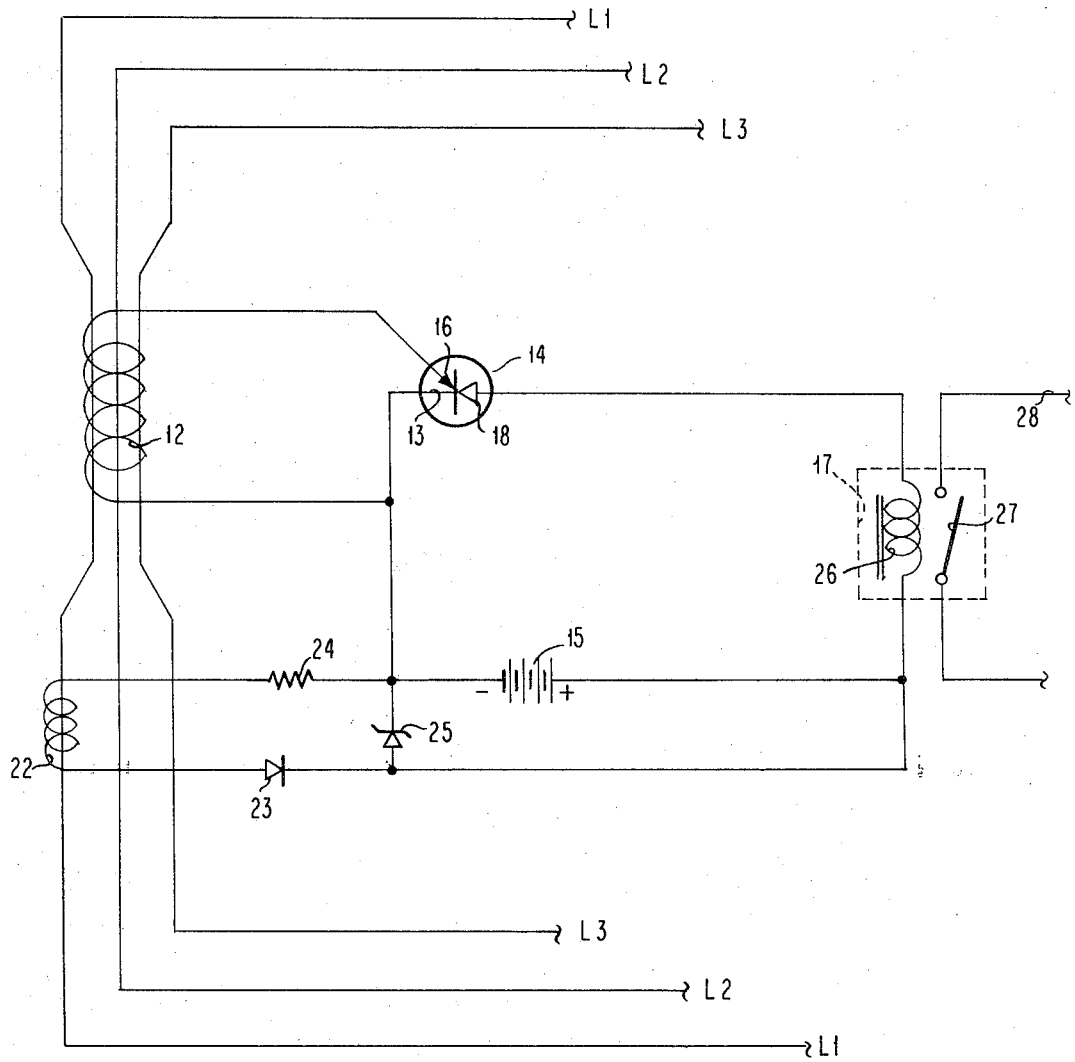
FIG. 3 is a combined electrical circuit diagram for the detector shown in FIG. 1 and charging circuit of FIG. 2.

In FIG. 3 there is schematically shown the combined fault detector circuit and battery charging circuits. Elements of FIG. 3, identical with those of FIGS. 1 and 2, bear the same reference numerals. In this FIG., alarm device 17 is shown as a relay coil 26 which is effective when energized to attract armature 27 to close the circuit in line 28. The alarm device may be a combination or any one of several, such as a radio frequency transmitter, audible or visible alarm or circuit breaker for automatic clearing. It will be noted that nearly all components can be enclosed in a unitary package and insulated for protection.

A modification can be made in the arrangement in FIG. 1 by providing individual iron cores for each line. A single winding is made with a portion of its turns on each core so as to achieve an instantaneous net current of zero. The ends of the winding are then connected across the gate electrode and cathode of SCR 14. A second winding could be wound with a portion of its turns on each core and oriented for maximum induced current to provide the actuating energy for the fault detector.

While preferred embodiments have been described, it will be apparent that various changes and modifications can be made without departing from the true spirit and scope of the present invention. It is intended that the inventions be limited only by the appended claims.

We claim:

1. A ground fault detector for conductors of an electrical supply system comprising, in combination,
   a. current transformer means responding to current imbalance in said supply conductors for exhibiting an induced voltage therein, including a primary ring-type current transformer having a winding adapted to surround a plurality of conductors of a supply line carrying alternating current;
   b. a second ring-type transformer attached to said primary transformer, forming a unitary structure therewith, having a winding adapted to surround one of said conductors;
   c. current responsive means including the gate circuit of a silicon-controlled rectifier energized from the winding of said primary transformer, being operable upon imbalance of the current carried in said supply line to indicate a ground fault;
   d. a battery in circuit with said current responsive means for supplying power to said silicon-controlled rectifier; and
   e. a circuit including a rectifier connected to the winding of said secondary transformer for charging said battery.